United States Patent
Blake et al.

(10) Patent No.: US 9,481,591 B1
(45) Date of Patent: Nov. 1, 2016

(54) DEVICE AND PROCESS TO TREAT AND DISINFECT SEWAGE, FOOD PROCESSING WASTEWATER AND OTHER BIOLOGICALLY CONTAMINATED WATER

(71) Applicants: Aaron Goldstein, Manalapan, NJ (US); Barbara Blake, Holmdel, NJ (US); Glen A. Menture, Keansburg, NJ (US)

(72) Inventors: Alexander Blake, Holmdel, NJ (US); Glen A. Menture, Keansburg, NJ (US); Barbara Blake, Holmdel, NJ (US); Aaron Goldstein, Manalapan, NJ (US)

( * ) Notice: Subject to any disclaimer, the term of this patent is extended or adjusted under 35 U.S.C. 154(b) by 201 days.

(21) Appl. No.: 13/998,841

(22) Filed: Dec. 16, 2013

(51) Int. Cl.
| | |
|---|---|
| C02F 3/30 | (2006.01) |
| C02F 9/00 | (2006.01) |
| C02F 1/32 | (2006.01) |
| C02F 1/78 | (2006.01) |
| C02F 1/00 | (2006.01) |

(52) U.S. Cl.
CPC ............... *C02F 9/00* (2013.01); *C02F 1/004* (2013.01); *C02F 1/32* (2013.01); *C02F 1/78* (2013.01); *C02F 3/30* (2013.01); *C02F 3/302* (2013.01); *C02F 3/308* (2013.01)

(58) Field of Classification Search
CPC .......... C02F 9/00; C02F 3/302; C02F 3/308
See application file for complete search history.

(56) References Cited

U.S. PATENT DOCUMENTS

| | | | | |
|---|---|---|---|---|
| 4,446,027 A | * | 5/1984 | Simmers | B01D 24/263 210/275 |
| 5,207,896 A | * | 5/1993 | Graves | B01D 21/0012 210/109 |
| 5,958,243 A | * | 9/1999 | Lawrence | B01D 61/20 210/137 |
| 2005/0072718 A1 | * | 4/2005 | Lacy | C02F 3/308 210/96.1 |
| 2007/0000835 A1 | * | 1/2007 | Gordon | B01D 61/025 210/603 |

* cited by examiner

*Primary Examiner* — Nina Bhat
*Assistant Examiner* — Dwan A Gerido

(57) ABSTRACT

The device and process is designed to treat sewage, food processing and other biologically contaminated wastewater without the addition of any chemical or physical agitation. It consists of a series of chambers in specific arrangement to achieve the required nutrient removal and disinfection which kills any bacteria, viruses, fungi and parasites. The treated water can be safely discharged, injected into the groundwater or used for irrigation.

1 Claim, 10 Drawing Sheets

FIG. 10
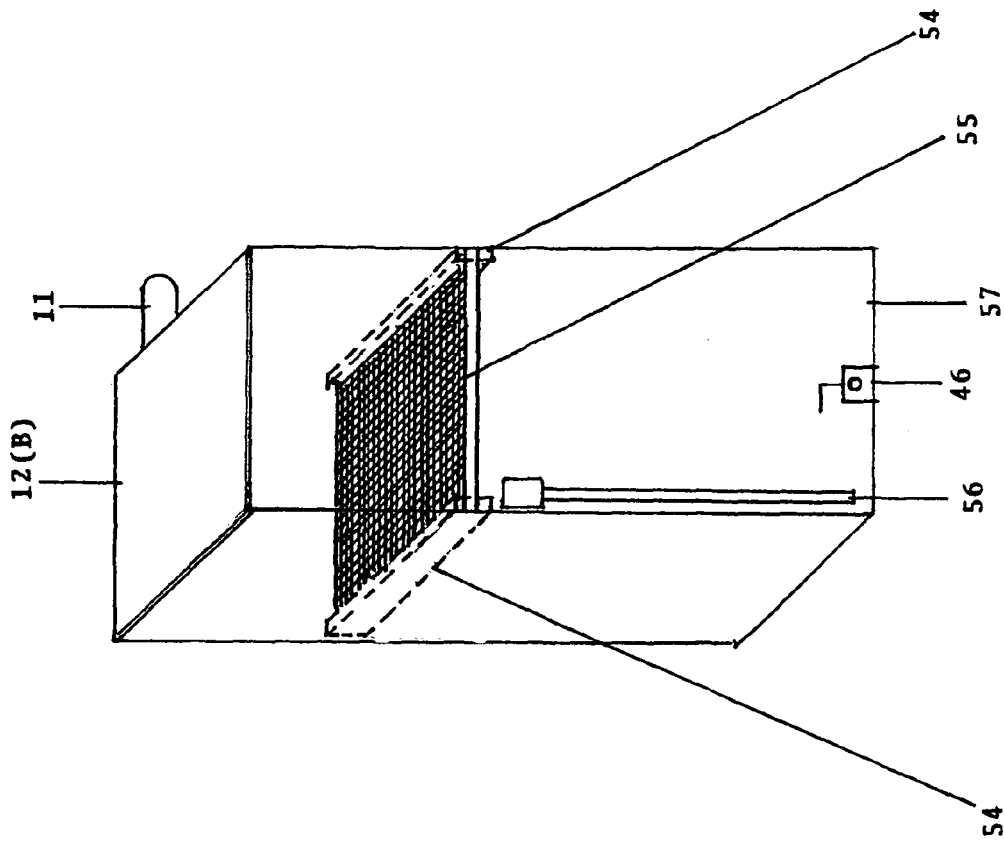
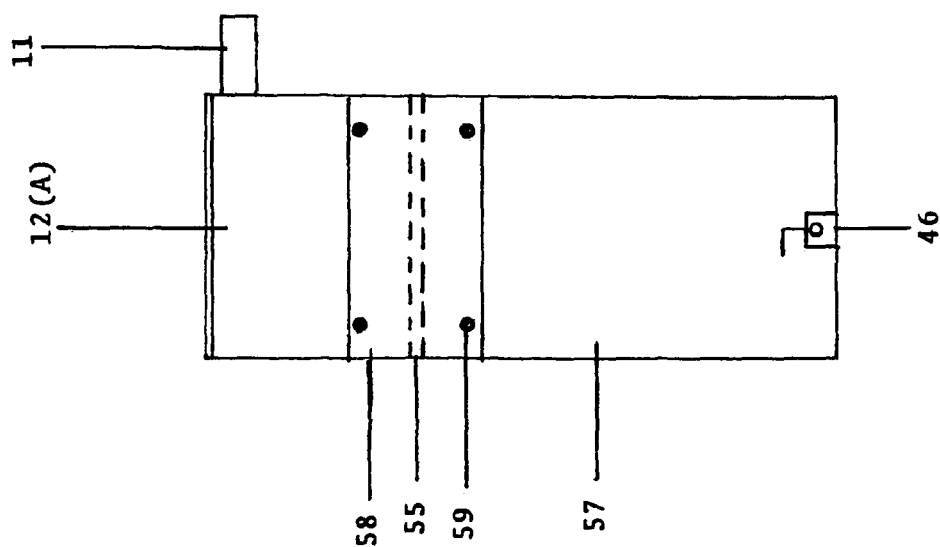

DEVICE AND PROCESS TO TREAT AND DISINFECT SEWAGE, FOOD PROCESSING WASTEWATER AND OTHER BIOLOGICALLY CONTAMINATED WATER

BACKGROUND OF THE INVENTION

The process and device of the present invention was developed and designed for the treatment and disinfection of sewage. However, it is also applicable for the treatment and disinfection of other biologically contaminated waste, such as food processing wastewater, etc. without the addition of chemicals or the use of reverse osmosis. This process and device reduces BOD loading, suspended solids to acceptable levels and kills bacteria, viruses, fungi and parasites in a continuous flow-through process. It requires only the minimum of manpower and can be designed to treat any size flow volume.

The elimination of commonly used chemicals, such as chlorine, is important since such chemicals also pose an environmental hazard.

SUMMARY OF THE INVENTION

The device of the present invention is designed in two versions, depending on the waste or wastewater volume to be treated and the specific space available. One version is of a single unit design housing all of the treatment chambers and therefore all treatment phases. The second version is basically identical in design and treatment chamber arrangement, however in this second version the chambers are separated and therefore can be arranged in two rows of four chambers each or even in a circular pattern. The device of the present invention can be designed to treat any size flow.

The process and device of the present invention is a series of biological processes in a specific arrangement to result in an enhanced reduction of nutrients and disinfection.

The treatment of the wastewater if achieved in a continuous flow-through process, the first chamber of which is a grinder pump chamber which houses one or more grinder pumps. In the case of larger flows in excess of approximately 30,000 gallons per day, an external grinder pump or comminutor is employed, thereby eliminating the grinder pump chamber.

The process and design of the present invention is of continuous flow-through design except for the buoyant material separator. The first chamber houses one or more grinder pumps for flows up to approximately 30,000 gallons per day. The grinder pump or pumps pump the waste into angled plate solids separators from which the solids settle into a solids collection trough at the bottom and the liquid or wastewater flows into a liquid or wastewater collection chamber. From the liquid or wastewater collection chamber the wastewater is pumped through a self cleaning filter such as, for example, manufactured by Orival, into an anaerobic treatment chamber. From the anaerobic treatment chamber the wastewater is again pumped through a self cleaning filter into the aerobic treatment chamber. The wastewater then flows under its own pressure into an anoxic treatment chamber. From the anoxic treatment chamber the wastewater is pumped through a self cleaning filter into a second aerobic treatment chamber from which it flows into a liquid or wastewater collection chamber under its own pressure. From the liquid or wastewater collection chamber the wastewater is pumped through another self cleaning filter into a pre-disinfection reservoir from which the wastewater is fed into the ultraviolet disinfection unit or units housed in the disinfection system housing. The self cleaning filters are of progressively finer pore size.

BRIEF DESCRIPTION OF THE DRAWINGS

FIG. 1

Figure 1:
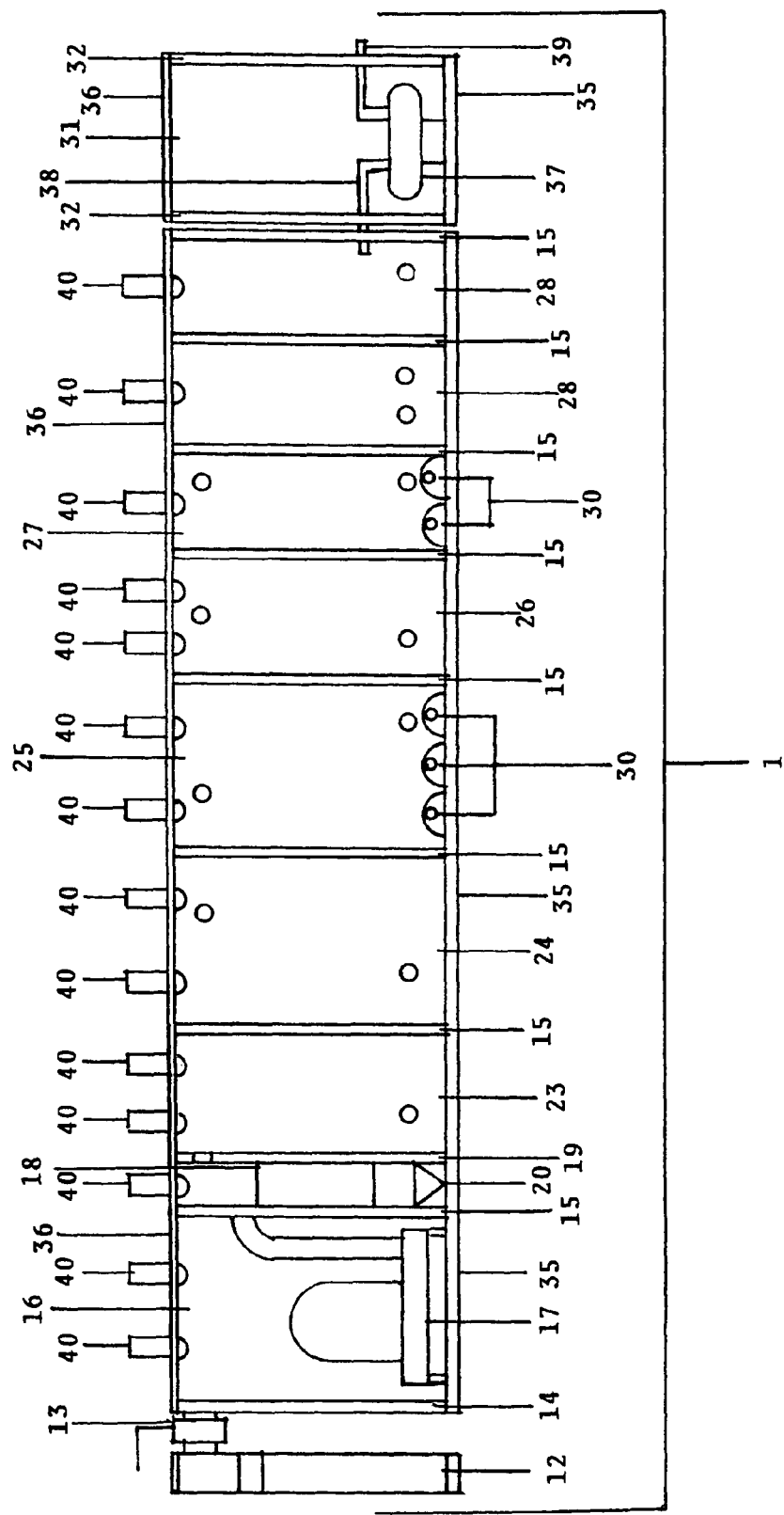
FIG. 1 depicts the continuous flow waste water treatment system front panel being removed depicting the various chambers for treating, sanitizing, and disinfecting contaminated waste water.
Figure 2:
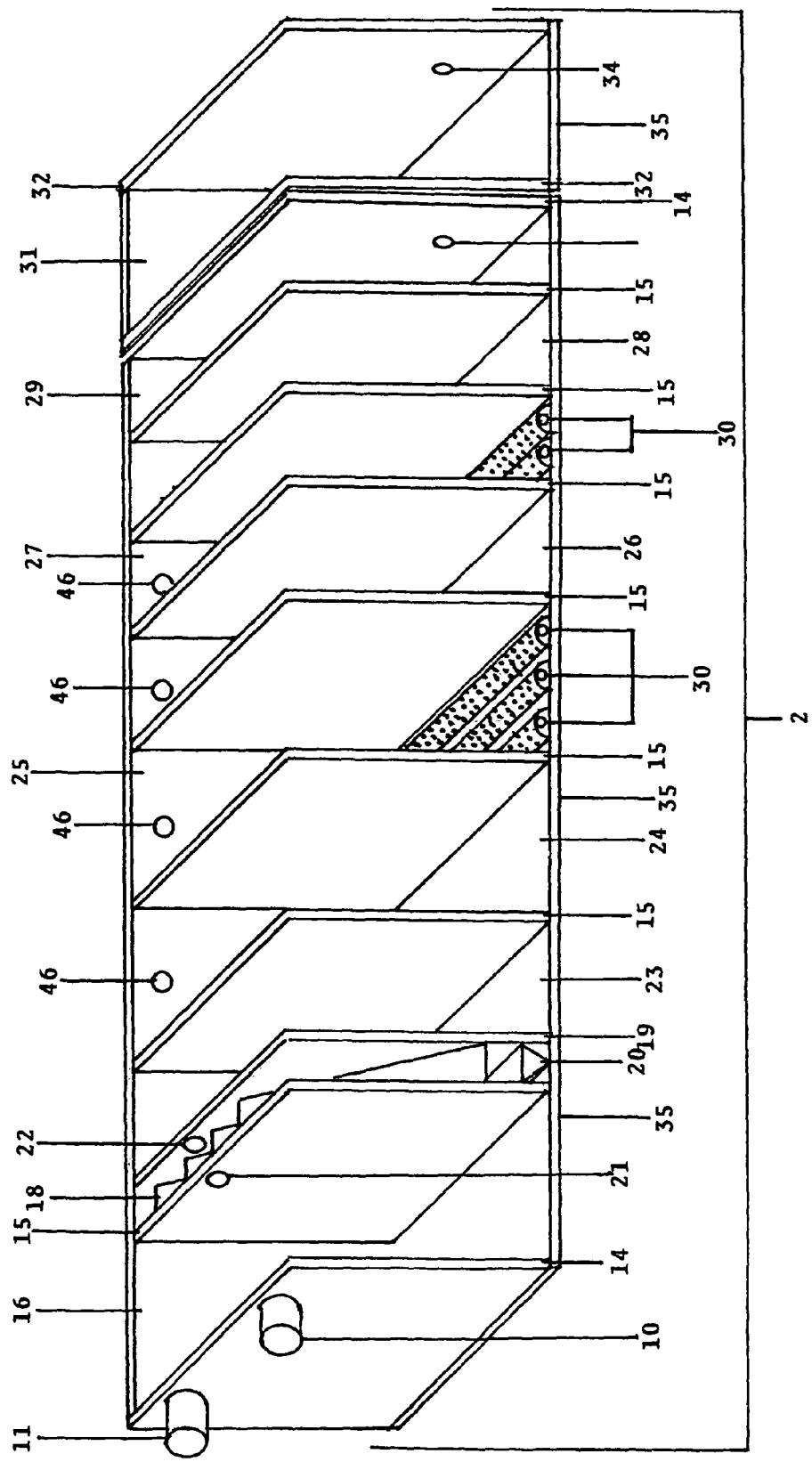
FIG. 2 depicts the continuous flow waste water treatment system front and top panels being removed depicting the various chambers for treating, sanitizing, and disinfecting contaminated waste water.
Figure 3:
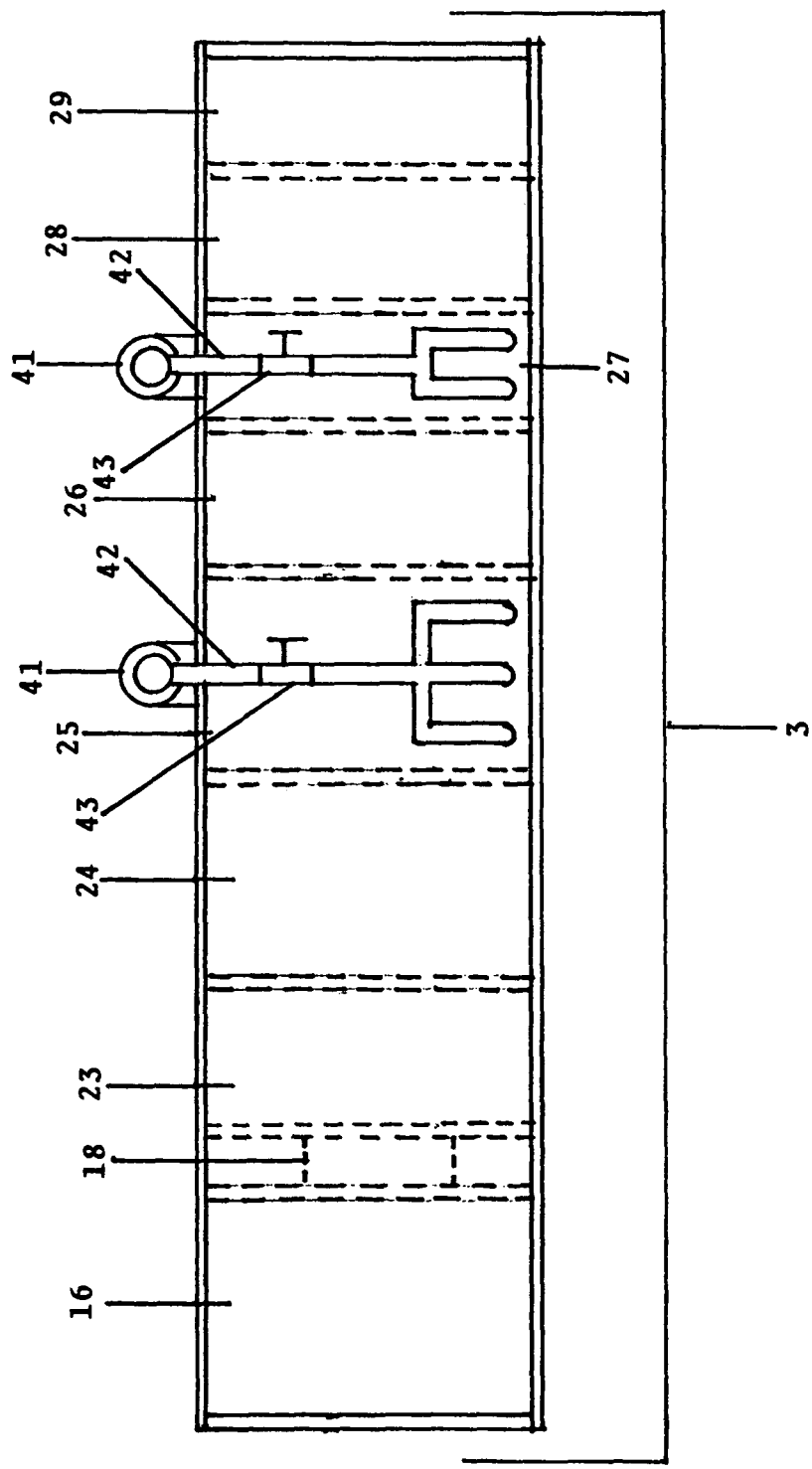
FIG. 3 depicts the air blower system used with the continuous flow waste water treatment system.
Figure 4:
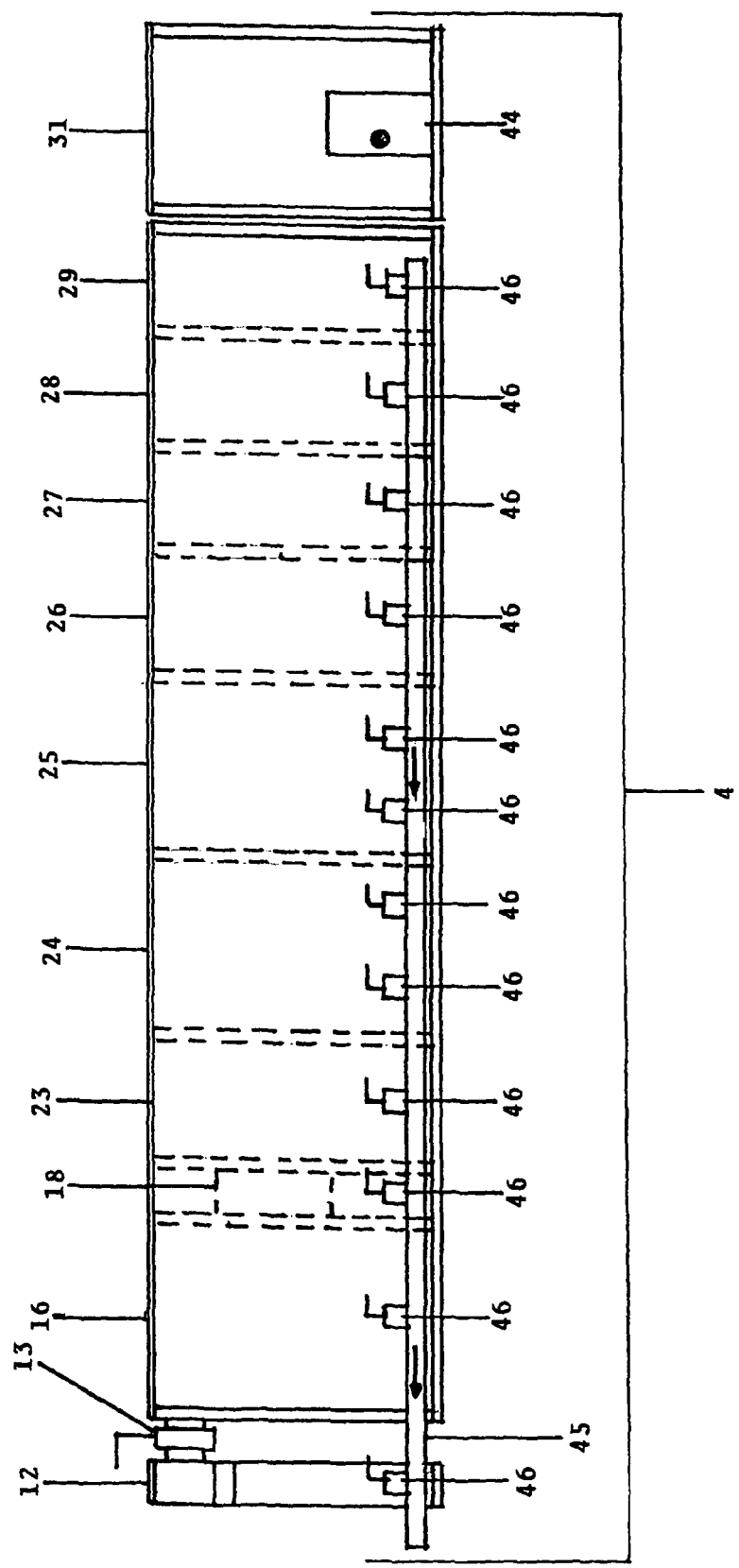
FIG. 4 depicts the continuous flow waste water treatment system and drain system.
Figure 5:
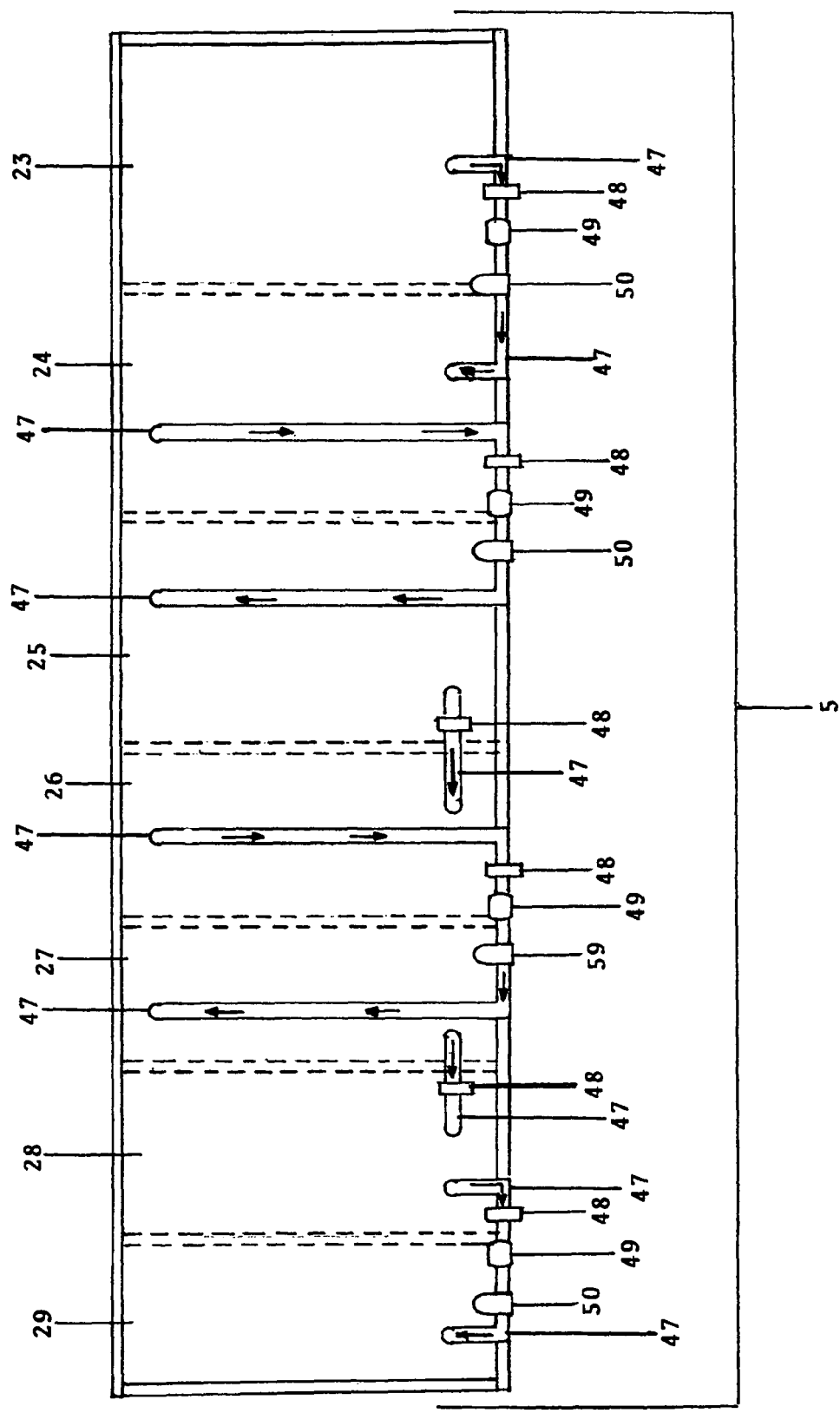
FIG. 5 depicts the continuous flow waste water treatment system rear view depicting the flow through the system.
Figure 6:
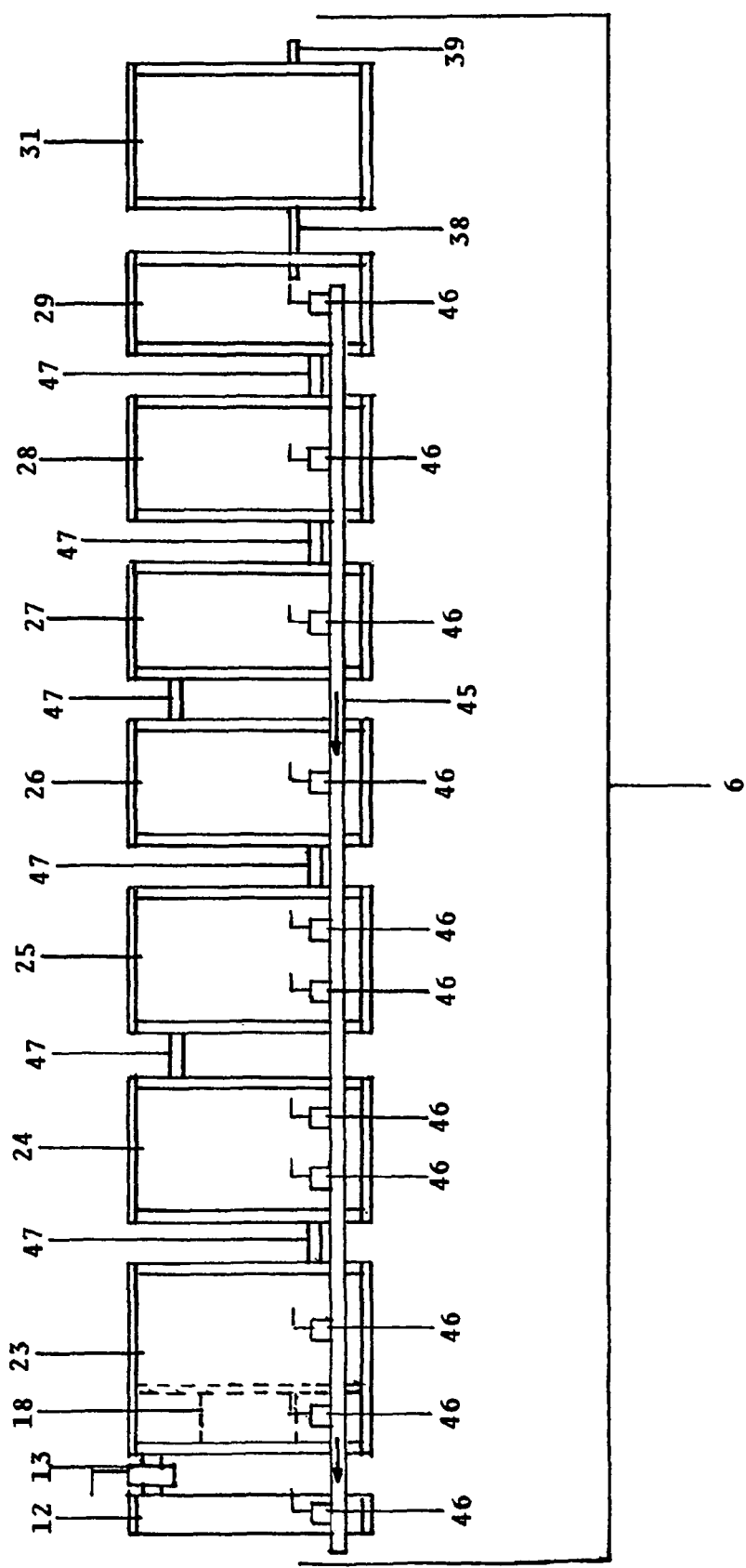
FIG. 6 depicts the front view modular construction continuous flow waste water treatment system.
Figure 7:
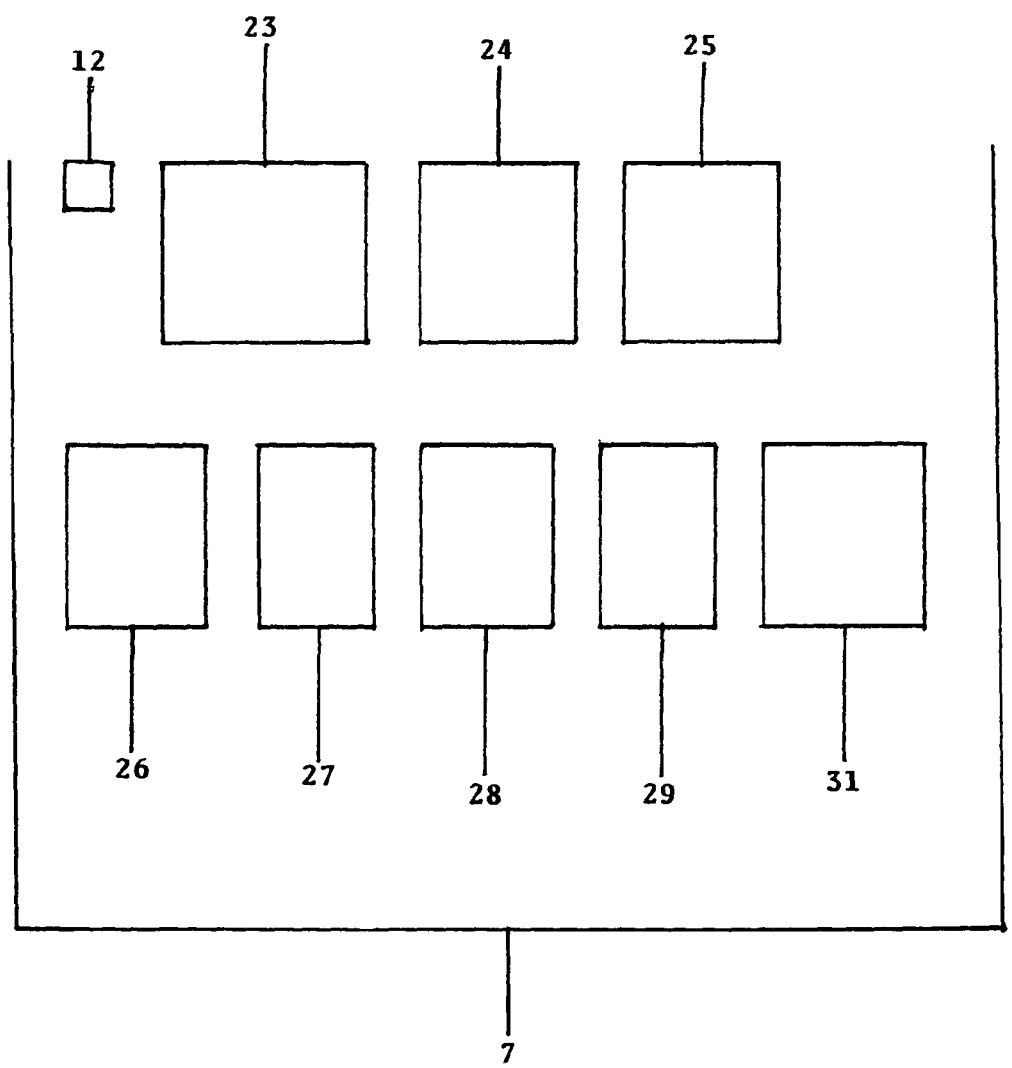
FIG. 7 depicts the top view modular construction continuous flow waste water treatment system.
Figure 8:
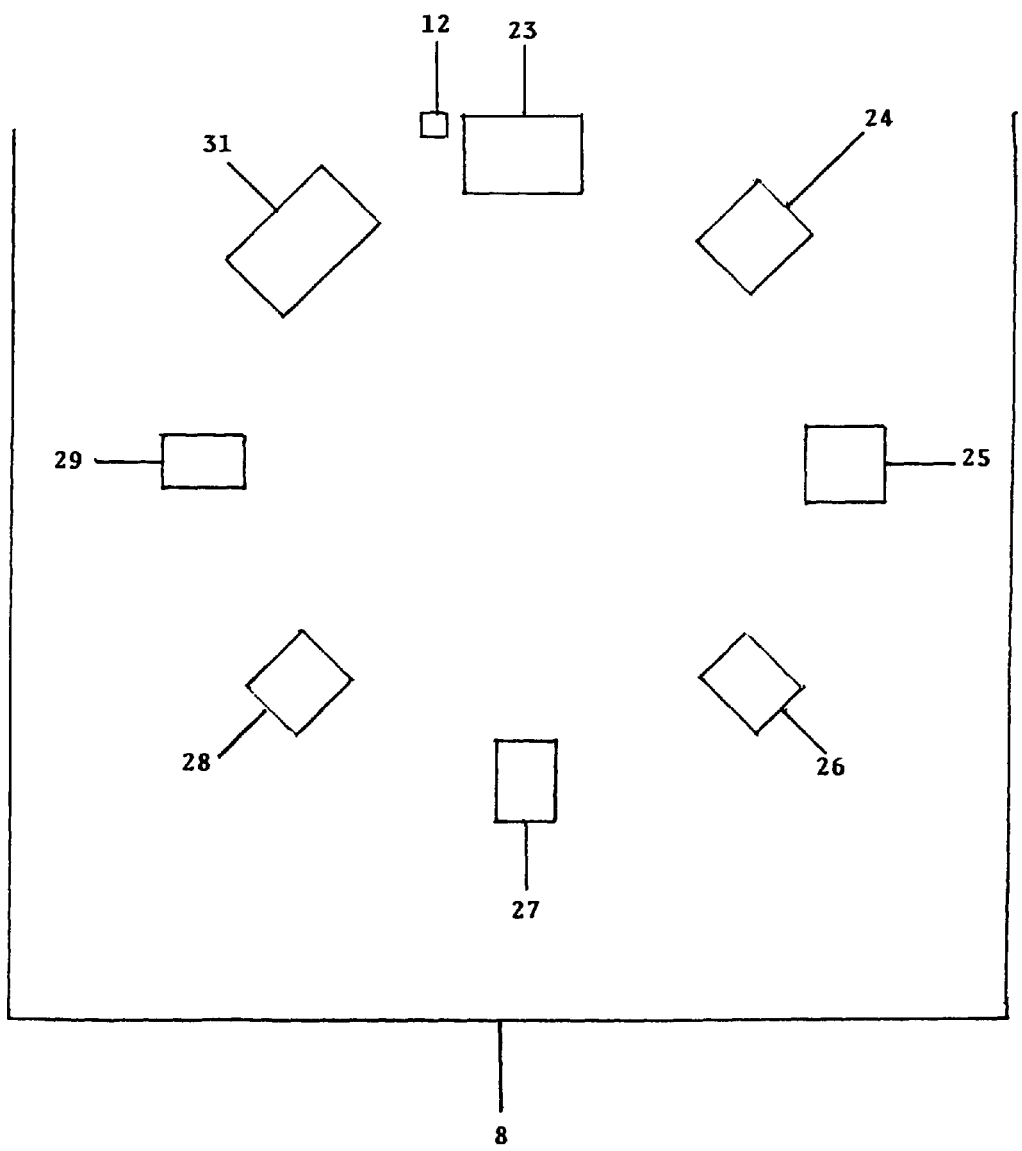
FIG. 8 depicts the top view circular modular arrangement of the continuous flow waste water treatment system.
Figure 9:
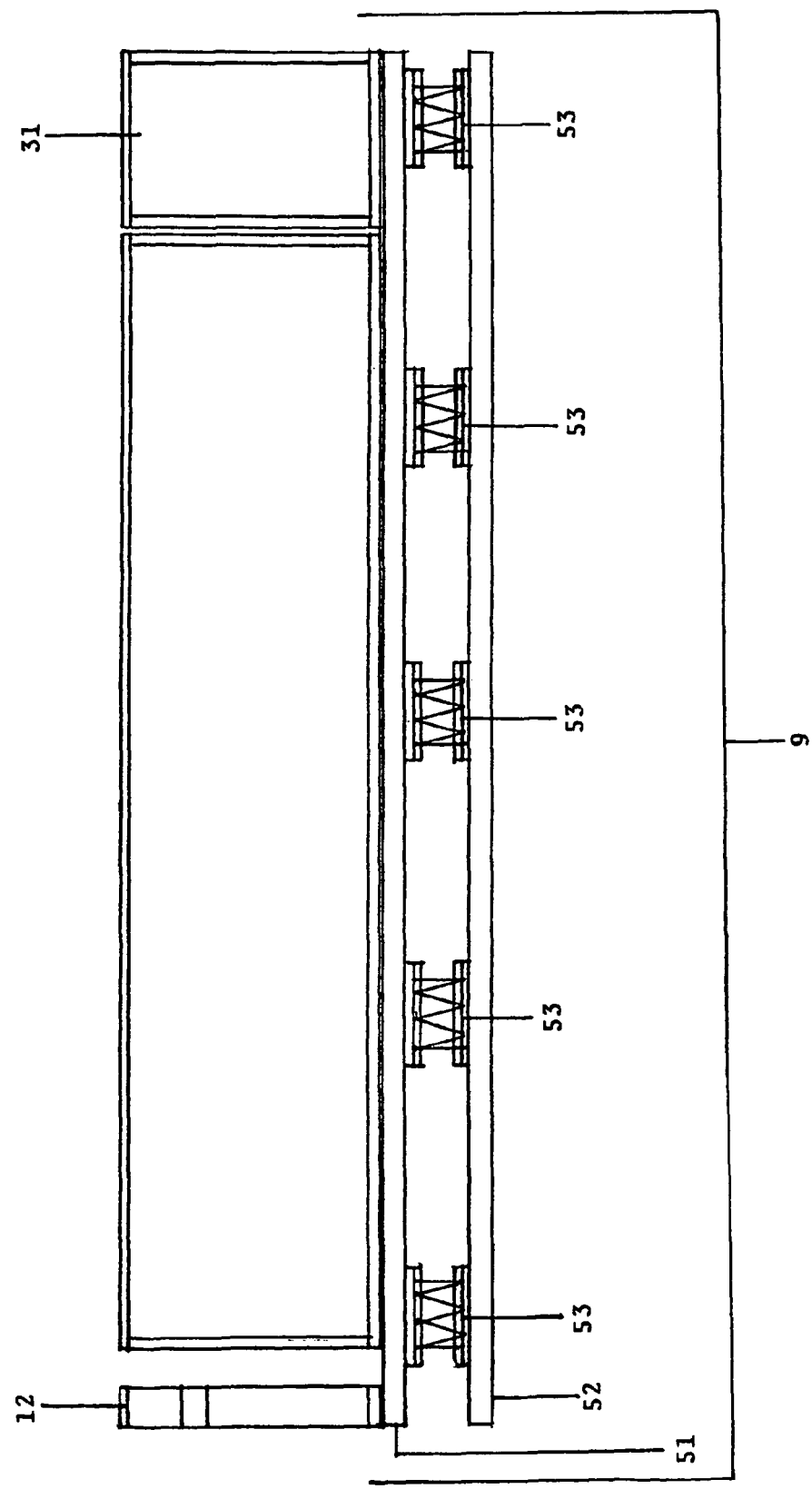

1 Sewage treatment device with front panel removed
12 Buoyant material separator
13 Valve to buoyant material separator
14 Endplates
15 Chamber separations
16 Grinder pump or pumps chamber
17 Grinder pump or pumps
18 Angled solids separation plates
19 Angled solids separation plates support plate
20 Solids collection trough
23 Liquid or wastewater collection chamber
24 Anaerobic treatment chamber
25 Aerobic treatment chamber
26 Anoxic treatment chamber
27 Aerobic treatment chamber
28 Liquid or wastewater treatment chamber
29 Pre-disinfection reservoir
30 Air diffusers
31 Disinfection system housing
32 Disinfection system housing side plates
35 Bottom plate
36 Top
37 Ultraviolet disinfection unit or units
38 Ultraviolet disinfection unit or units inlet line or pipe
39 Ultraviolet disinfection unit or units discharge line or pipe
40 Chamber rinse spray nozzles

FIG. 2

2 Sewage treatment device with top and front panel removed
10 Sewage intake
11 Outlet to buoyant material separator
14 Endplates
15 Chamber separations
16 Grinder pump or pumps chamber
18 Angled solids separation plates 19 Angled solids separation plates support plate
20 Solids collection trough
21 Intake from grinder pump or pumps into angled separation plates
22 Liquid or wastewater flow-through into liquid or wastewater collection chamber
23 Wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
30 Air diffusers
31 Disinfection system housing
32 Disinfection system housing side plates
33 Opening for ultraviolet disinfection unit or units inlet line or pipe
34 Opening for ultraviolet disinfection unit or units discharge line or pipe
35 Bottom plate

FIG. 3

3 Front view of air blower system
16 Grinder pump or pumps chamber
18 Angled solids separation plates
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
41 Air blowers
42 Air supply line
43 Air flow control valves

FIG. 4

4 Front view with chamber drain system
12 Buoyant material separator
13 Valve to buoyant material separator
16 Grinder pump or pumps chamber
18 Angled solids separation plates
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
31 Disinfection system housing
44 Door of disinfection system housing
45 Chamber drain pipe
46 Buoyant material separator and chamber discharge valves

FIG. 5

5 Rear view illustrating flow-through
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
47 Transfer or pipe
48 Valves
49 High pressure pump
50 Self cleaning filter

FIG. 6

6 Front view of modular sewage treatment device
12 Buoyant material separator
13 Valve to buoyant material separator
18 Angled solids separation plates
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
31 Disinfection system housing
38 Ultraviolet disinfection unit or units inlet line or pipe
39 Ultraviolet disinfection unit or units discharge line or pipe
45 Chamber drain pipe
47 Transfer or pipe

FIG. 7

7 Top view of modular arrangement of sewage treatment device
12 Buoyant material separator
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
31 Disinfection system housing

FIG. 8

8 Top view of circular arrangement of modular sewage treatment device
12 Buoyant material separator
23 Liquid or wastewater collection chamber
24 Anaerobic treatment chamber
25 Aerobic treatment chamber
26 Anoxic treatment chamber
27 Aerobic treatment chamber
28 Liquid or wastewater collection chamber
29 Pre-disinfection reservoir
31 Disinfection system housing

FIG. 9

9 Front view of sewage treatment device for marine or naval application
12 Buoyant material separator
31 Disinfection system housing
51 Upper support beam
52 Lower support beam
53 Shock absorbers

FIG. 10

11 Outlet to buoyant material separator
12 Buoyant material separator

54 Screen channels
55 Screen
56 High/low level control
57 Wastewater chamber
58 Cover
59 Cover fasteners
46 Drain value

DESCRIPTION OF THE PREFERRED EMBODIMENTS

The device and process of the present invention has been developed for the treatment and disinfection of sewage. It is also effective in the treatment of food processing wastewater and possibly other biologically contaminated water. It does not require any chemical addition or the use of reverse osmosis. These factors make the process extremely economical. The only continuing expenses are for electricity and periodic use of fresh water for the backwash of the self cleaning filters and periodic rinsing of the chambers. Treated water as it emanates from the ultraviolet or ozone disinfection may be used for these purposes.

The wastewater is entered into the grinder pump chamber 16. Any larger items or particles are ground into small particles by the grinder pump or pumps 17 and pumped into the angled solids separation plates 18. The solids slide down the angled solids separation plates 18 and settle in the solids collection trough 20, from which they are periodically drained. Any buoyant material is periodically drained through a butterfly or ball valve 13 into the buoyant material separator 12. The buoyant material settles on screen 55 and the water collects in the water chamber 57 from which it is drained through valve 46 when signaled by the high/low level control 56. The screen 55 slides in two screen channels 54 to allow for the removal of screen 55 and the dumping of the buoyant solids.

The wastewater above the angled solids separation plates 18 flows through opening 22 into the wastewater collection chamber 23. From the wastewater collection chamber the wastewater is pumped through valve 48 by the high pressure pump 49 into and through the self cleaning filter 50 into the anaerobic treatment chamber 24. From the anaerobic treatment chamber 24 the wastewater is pumped through valve 48 by high pressure pump 49 into and through the self cleaning filter 50 into the aerobic treatment chamber 25.

The air to the aerobic treatment chamber 25 is generated by an air blower 41 through air supply line 42 to the air diffusers 30. The air flow can be regulated by air flow control valve 43. From the aerobic treatment chamber 25 the wastewater flows under its own pressure through valve 48 and transfer pipe 47 into the anoxic treatment chamber 26. From the anoxic treatment chamber 26 the wastewater is again pumped through valve 48 and transfer pipe 47 by high pressure pump 49 into and through a self cleaning filter 50 into the wastewater collection chamber 28. From the wastewater collection chamber 28 the wastewater is pumped through transfer pipe 47, by high pressure pump 49 into and through a self cleaning filter 50 into the pre-disinfection chamber 29. The water then flows by gravity into the ultraviolet disinfection unit or units inlet line or pipe 38 and is discharged through ultraviolet disinfection unit or units discharge line or pipe 39.

All valves in the device are preferably adjustable to the required per minute flow. The size and volume of the treatment chambers 24, 25, 26 and 27 are calculated according to the per minute flow and required retention time in above treatment chambers. If the required total retention time in the treatment chambers 24, 25, 26, and 27 is only 120 minutes, the chamber volume and therefore the size would be less or larger if the required retention time is longer.

The per minute capacity of the ultraviolet disinfection unit or units have to be able to accommodate the per minute flow-through the device or devices. All transfer pipes 47, valves 48, high pressure pumps 49 and self cleaning filters 50 also have to be calculated to permit the per minute flow-through. The self cleaning filters 50 are of progressively finer pore size. The most downstream filter has to have a pore size of no greater than 10 since the water from pre-disinfection chamber 29 flows into the ultraviolet disinfection unit or units 37. If multiple ultraviolet disinfection units 37 are required because of the per minute flow-through volume, same are connected with an intake manifold and discharge manifold (not illustrated).

Each of the chambers is equipped with chamber rinse nozzles 40. The number of rinse nozzles 40 for each chamber has to be sufficient to allow thorough rinsing and cleaning of the total chamber. Prior to and after rinsing and cleaning of the chambers, the chambers are drained through chamber or drain pipe 45 and chambers drain valves 46.

In the anaerobic treatment chamber 23 microorganisms absorb most of the BOD loading. Oxidation converts ammonia to nitrates in the aerobic treatment chamber 25 and the balance of BOD loading is removed. The air to the aerobic treatment chamber 24 is generated by air blower 41 and supplied to the air diffusers 30 through the air supply line 42 and the air flow control valve 43 to the air diffusers 30. The number of air diffusers 30 required depends on the area and volume of the aerobic treatment chamber 25. In the anoxic treatment chamber 26 the nitrates are converted to nitrogen by microbial organism absorption of the nitrogen and oxygen compounds. In the second aerated treatment chamber 27 the water is re-aerated and the oxidation completed. The air to the second aerobic treatment chamber 27 is generated by an air blower 41 and supplied to the air diffusers 30 through air supply line 42 and air flow control valve 43. The number of required air diffusers 30 depends on the area and volume of the aerobic treatment chamber 27. On smaller devices of the present invention one air blower 41 may be sufficient to supply air to the air diffusers 30 in both aerobic treatment chambers 25 and 27.

In the ultraviolet or ozone disinfection unit or units 37 coliform, *e-coli* and other bacteria as well as viruses, fungi and parasites are killed.

The device of the present invention is equipped with hinged covers which are, on larger devices, hydraulically operated. This applies to both versions, the single and modular design.

It is to be understood that, depending on the application, all components may not have to be included in the device of the present invention.

It is also to be understood that on larger flows external grinder pump or pumps such as comminutors are used.

| RAW (UNTREATED) | | |
|---|---|---|
| PARAMETER | CONCENTRATION | UNITS |
| TEST RESULTS OF THE TREATMENT OF SEWAGE | | |
| BOD | 240 | mg/l |
| Total suspended solids | 216 | mg/l |
| Total Phosphorous | 8.27 | mg/l |
| Nitrogen | 57.9 | mg/l |
| Fecal Coliform | 8,800,000 | MPM |

-continued

| PARAMETER | CONCENTRATION | UNITS |
|---|---|---|
| RAW (UNTREATED) | | |
| TREATED (Test 1) | | |
| BOD | 7 | mg/l |
| Total suspended solids | 4 | mg/l |
| Total Phosphorous | 4.56 | mg/l |
| Nitrogen | 31.5 | mg/l |
| Fecal Coliform | 110 | MPM |
| TREATED (Test 2) | | |
| BOD | 6 | mg/l |
| Total suspended solids | 4 | mg/l |
| Total Phosphorous | 4.54 | mg/l |
| Nitrogen | 30.8 | mg/l |
| Fecal Coliform | 30 | MPM |
| TREATED (Test 3) | | |
| BOD | 10 | mg/l |
| Total suspended solids | 2 | mg/l |
| Total Phosphorous | 4.70 | mg/l |
| Nitrogen | 31.8 | mg/l |
| Fecal Coliform | 10 | MPM |
| TEST RESULTS OF FOOD PROCESSING WASTE | | |
| BOD | 1,650 | mg/l |
| Total suspended solids | 760 | mg/l |
| Total Phosphates | 26.6 | mg/l |
| Nitrogen | 1.44 | mg/l |
| E. Coli | 7,700,000 | MPM |
| TREATED (Test 1) | | |
| BOD | 178 | mg/l |
| Total suspended solids | 8 | mg/l |
| Total Phosphates | 0.05 | mg/l |
| Nitrogen | 0.11 | mg/l |
| E. Coli | 840 | MPM |
| TREATED (Test 2) | | |
| BOD | 707 | mg/l |
| Total suspended solids | 4 | mg/l |
| Total Phosphates | 0.08 | mg/l |
| Nitrogen | 0.05 | mg/l |
| E. Coli | 30 | MPM |
| TREATED (Test 3) | | |
| BOD | 102 | mg/l |
| Total suspended solids | 36 | mg/l |
| Total Phosphates | 0.18 | mg/l |
| Nitrogen | 0.05 | mg/l |
| E. Coli | 30 | MPM |

What is claimed is:

1. A continuous flow through sanitary, municipal, sewage, storm water, marine vessels, contaminated waste water system comprising:
   a waste water inlet in operative connection with a first phase chamber comprising a grinding pump chamber which grinds and pumps waste water containing solids into a slurry which is connected to and receives the ground waste water slurry;
   a second phase baffled angled plate separation chamber for separating solids from the waste water slurry forming a liquid stream and solids stream said liquid stream in fluid connection with;
   a third phase anaerobic treatment chamber which receives the separated liquid stream and microbially treating the liquid stream;
   a fourth phase aerobic treatment chamber which receives the microbial treated liquid stream which is in communication with a blower for introducing air into the chamber for oxidation and treatment of the liquid stream which is in fluid connection with;
   a fifth phase anoxic unit wherein said aerobically treated liquid water stream containing nitrates are converted to nitrogen and oxygen by microbial absorption which is fluid connection with;
   a sixth phase aeration chamber in communication with a blower for introducing air into the chamber wherein the liquid stream is re-aerated and oxidized; said aeration chamber being in fluid communication with an ultraviolet or ozone disinfection unit for sterilization and disinfection of the water to produce a disinfected water;
   and wherein the improvement comprises a plurality of self-cleaning, progressively finer pore sized filters mounted on the outside of each chamber, said filters configured to be backwashed with said disinfected water from the ozone disinfection unit; and further comprising reservoirs or tanks for water collection and retention of said water and controlled air and liquid flow valves for control of water into the ultraviolet or ozone disinfection unit.

* * * * *